H. H. HIRSCH.
VEHICLE ELECTRIC SIGNALING DEVICE.
APPLICATION FILED MAY 26, 1915.
1,181,665.
Patented May 2, 1916.
3 SHEETS—SHEET 1.
FIG. I.
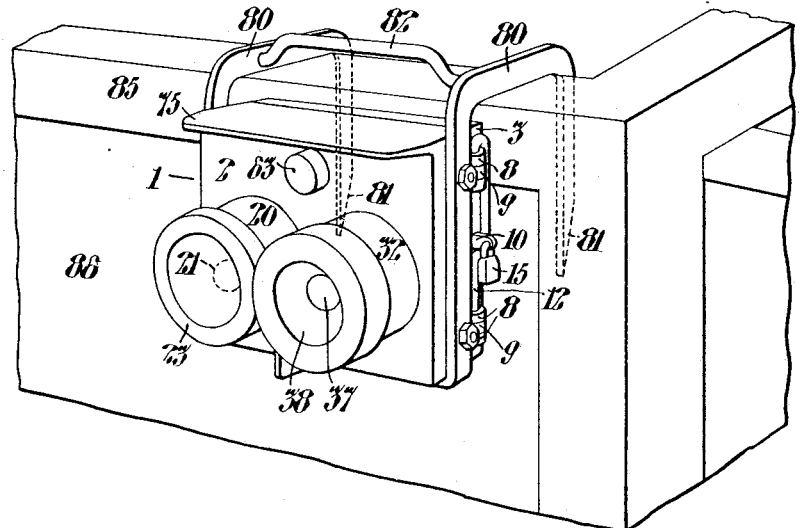
FIG. II.
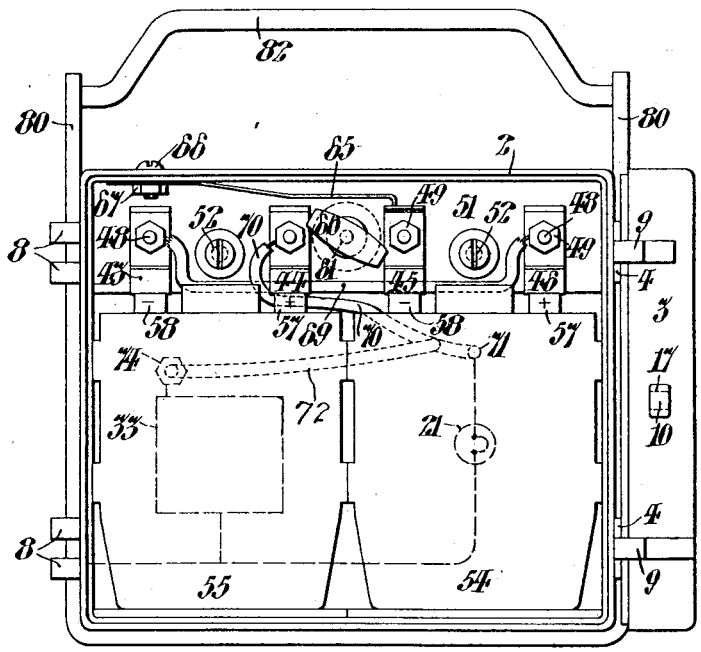
WITNESSES:
Philip W. Vessey.
Frank E. Paege
INVENTOR:
Hiram Harry Hirsch,
by Attorney H. H. HIRSCH.
VEHICLE ELECTRIC SIGNALING DEVICE.
APPLICATION FILED MAY 26, 1915.
1,181,665.
Patented May 2, 1916.
3 SHEETS—SHEET 2.
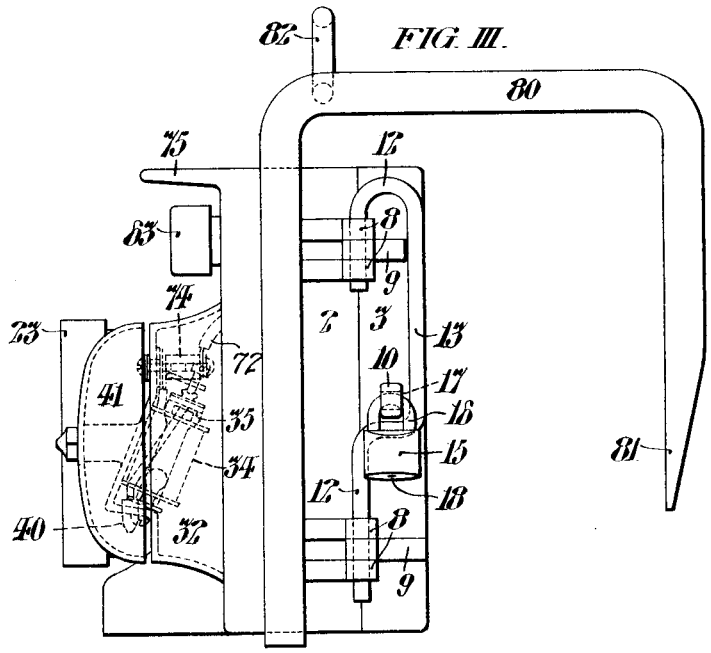
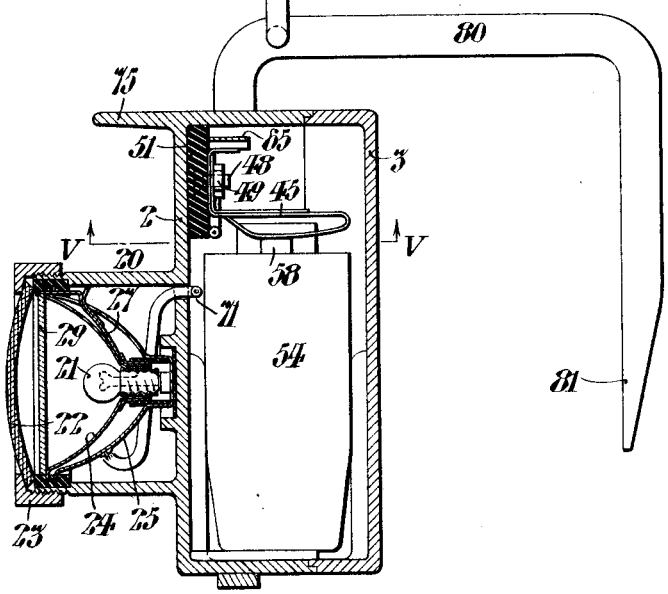
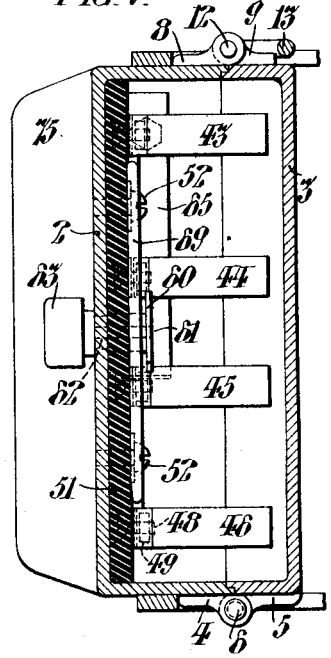
WITNESSES:
INVENTOR:

H. H. HIRSCH.
VEHICLE ELECTRIC SIGNALING DEVICE.
APPLICATION FILED MAY 26, 1915.
1,181,665.
Patented May 2, 1916.
3 SHEETS—SHEET 3.
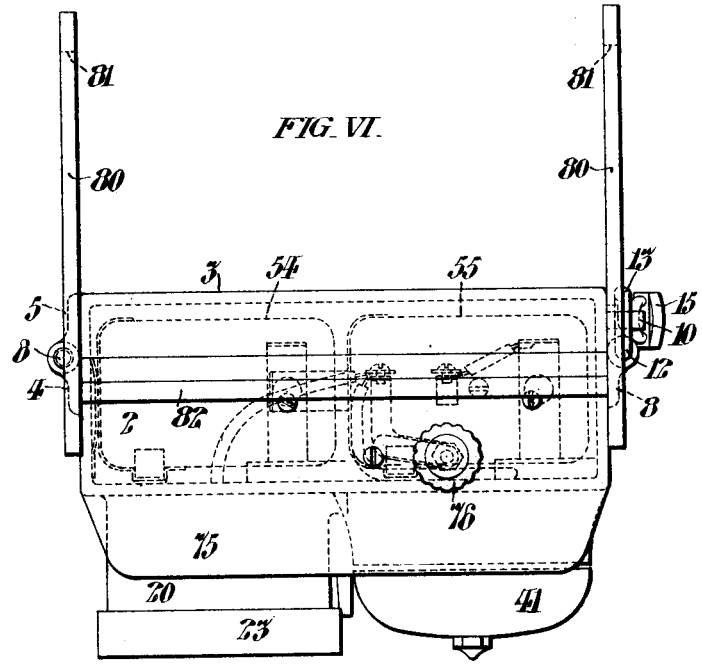
FIG. VI.
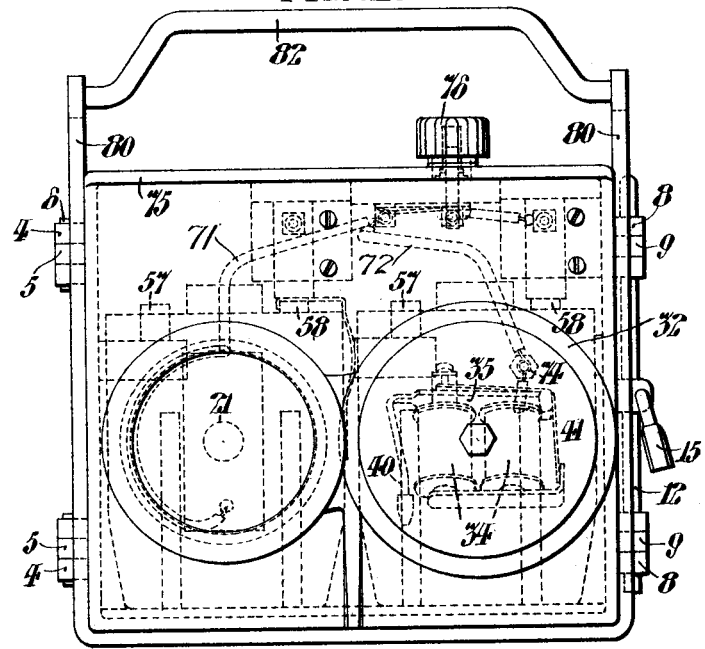
FIG. VII.
WITNESSES:
Philip W. Vissey.
Frank E. Paige.
INVENTOR:
Hiram Harry Hirsch,
by Arthur E. Paige,
Attorney.

UNITED STATES PATENT OFFICE.

HIRAM HARRY HIRSCH, OF PHILADELPHIA, PENNSYLVANIA.

VEHICLE ELECTRIC SIGNALING DEVICE.

1,181,665.  Specification of Letters Patent.  Patented May 2, 1916.

Application filed May 26, 1915. Serial No. 30,556.

*To all whom it may concern:*

Be it known that I, HIRAM HARRY HIRSCH, a citizen of the United States, residing at Philadelphia, in the State of Pennsylvania, have invented a certain new and useful Improvement in Vehicle Electric Signaling Devices, whereof the following is a specification, reference being had to the accompanying drawings.

My invention is particularly adapted for attachment to mine cars and locomotives. Such vehicles are used in the dark galleries of coal and other mines and it is the present practice to merely provide them with headlights, without any means for manifesting an audible alarm. Consequently, many accidents are caused by such cars overtaking miners who are traversing said galleries in the same direction as the cars and do not hear the approach of the latter.

My invention provides a complete electric signaling system, including both a visible and audible alarm; said system being mounted in a casing with which it is portable, having means whereby said casing may be detachably secured upon the front wall of such a vehicle.

In the form of my invention hereinafter described, the electric signaling system includes a switching mechanism which may be operated by a handle projecting exterior to the casing inclosing said system, whereby both an audible and visible signal may by both simultaneously included in or excluded be simultaneously included in or excluded from circuit with a storage battery inclosed by said casing. As hereinafter described, the audible alarm may be a horn provided with a vibratory electric sounder, or a bell, and the visible signal is preferably a red light lamp.

Moreover, as the apparatus constructed in accordance with my invention is subject to manipulation by workmen who are not only entirely ignorant of electrical construction but inclined to tamper with such devices, I find it desirable to seclude the electrical elements of my invention in a durable metallic casing provided with locking means so that said electrical elements are only accessible to those authorized to inspect them and provided with keys by which the casings may be unlocked.

My invention includes the various novel features of construction and arrangement hereinafter more definitely specified and claimed.

In the drawings; Figure I is a fragmentary perspective view of a front top corner of a mine car having a convenient embodiment of my invention detachably connected with the front wall of said car at the top thereof, and including a red light electric lamp and an electrically operative horn. Fig. II is an elevation of the form of my invention shown in Fig. I, with the casing open. Fig. III is a side elevation of an embodiment of my invention similar to that shown in Figs. I and II except that a bell is substituted for the horn. Fig. IV is a vertical sectional view through the forms of my invention shown in Figs. I to III inclusive, showing the construction and arrangement of the red light electric lamp. Fig. V is an inverted plan sectional view taken on the line V, V in Fig. IV. Fig. VI is a plan view showing a modified form of my invention wherein the construction and arrangement of the bell is such as shown in Fig. III, but the switching mechanism is provided with an exterior handle at the top of the casing, instead of at the front of the casing as in the forms of my invention shown in Figs. I to III inclusive. Fig. VII is a front elevation of the form of my invention shown in Fig. VI.

Referring to Figs. I to V inclusive, the casing 1 includes the body 2 and lid 3 having respective complementary hinge members 4 and 5 (best shown in Fig. V) preferably permanently connected by rivet pintles 6. Said body and lid have respective complementary clasp members 8 and 9, and said lid has the lock keeper lug 10 adjacent said clasp members, as best shown in Fig. III. The locking bar 12 has its opposite ends extending in the same direction, in axial alinement, and adapted to connect said clasp members 8 and 9, and has an intermediate bight 13 adapted to engage said keeper lug, as shown in Fig. III. The padlock 15 has the shackle 16 fitted to the opening 17 in said keeper lug, whereby said locking bar 12 may be held in engagement with said clasp members to secure said casing in closed position. When said padlock 15 is unlocked by a key fitted in the key hole 18 thereof, and said shackle 16 removed from the keeper lug 10, said locking bar 12 may be turned out of engagement with said lug 10 so that it may be shifted upwardly, with reference to Fig. III, to disengage its axially alined ends from said clasp members 8 and 9, so that said lid 3 may be opened as shown in Fig. I, affording access to the electrical elements which are secluded in said casing when the latter is locked. Said casing 1 has the lamp frame 20 upon the front thereof, as shown in Figs. I and IV, inclosing the electric incandescent lamp 21 having the red glass 22 at the front thereof, conveniently secured in detachable relation with said frame 20 by the flanged ring 23. As indicated in Fig. IV, said lamp 21 is conveniently provided with the reflector 24 within the lamp casing 25, which is detachably mounted in said frame 20, and a switch member 27 normally completing the electric circuit through said casing, while upheld by the frangible transparent glass panel 29; said switch member 27 being a spring which automatically moves downwardly from the position shown in Fig. IV, and thus breaks the lamp circuit, when said frangible element 29 is broken or otherwise removed. Said spring 27 and its associated elements thus constitute a safety switch mechanism automatically operative to extinguish the lamp 21 when the glass front of the lamp casing is broken and thus prevent accidental ignition of any explosive atmosphere surrounding said casing 1. However, such construction and arrangement of a safety lamp *per se*, forms the subject matter of Letters Patent of the United States, 1,121,249, granted to me December 15, 1914. Said casing 1 also has, upon the front thereof, the audible alarm frame 32 inclosing an electric vibrator 33, which, as indicated in Figs. III and VII, includes a pair of magnet coils 34 in operative relation with the vibartory armature 35. Said armature may be operatively connected with the diaphragm 37 of the horn 38 shown in Fig. I, and thus serve as a sounder for said horn, or, it may be provided with the clapper 40 for the bell 41, as shown in Fig. VII.

As shown in Figs. II and V, said casing 1 incloses spring terminals 43, 44, 45 and 46, each shaped as shown in Fig. IV, and independently secured, by respective bolts 48 and nuts 49, in insulated relation, upon the panel of insulating material 51 which is rigidly connected with the casing body 2 by the screws 52 shown in Fig. II. As shown in Fig. II, two storage battery cells, 54 and 55, which are constructed alike and each provided with a positive terminal 57 and a negative terminal 58, are fitted in the body 2 of said casing 1, respectively in electrical connection with said spring terminals, so as to include said cells in circuit with both the visible and audible alarms aforesaid, under control of switch mechanism including the spring contact lever 60 in said casing, the shaft 61 for said lever, which is mounted to turn in the bearing 62 in the casing body 2, as shown in Fig. V, and has the handle 63, on said shaft, exterior to said casing. The electrical connections for said circuit include the contact spring 65 which is rigidly connected at one end with the casing body 2, by the bolt 66 and nut 67, as shown in Fig. II, and has its free end in contact with the spring terminal 45 in the casing, as shown in Figs. II and IV, when the circuit is closed. However, said contact spring 65 is raised by said lever 60 when said handle 63 is turned, to break the circuit. Said terminal 45 is in electrical contact with the terminal 58 of the battery cell 54 and the terminal 57 of said cell is in electrical contact with the spring terminal 46 in the casing, and said terminal 46 is connected with the terminal 48 in the casing by the bridge wire 69. Terminal signaling devices 43 are in contact with the terminal 58 of the battery cell 55, and the terminal 57 of said cell is in contact with the spring terminal 44 in said casing. Said terminal 44 has the wire 70 leading therefrom, with the two branches 71 and 72 respectively leading to the visible alarm, as shown in Fig. IV, and to the terminal 74 of the audible alarm vibrator, shown in Fig. VII. The connections through both alarms extend to the casing body 2 so that they are in multiple electrical connection, with said casing and the spring 65 as a common return conductor. In order that the electrical connections aforesaid may be conveniently traced, I have indicated the lamp 21 and vibrator 33 diagrammatically in Fig. II, and it is obvious that both said visible and audible signaling devices may be simultaneously included in or excluded from circuit with the battery by manipulation of the handle 63, as above described.

It may be observed, with reference to Figs. I, III and IV, that the exterior handle 63 of the switch mechanism is protected from falling coal, etc., by the overhanging ledge 75 on the casing body 2, which also serves to fend falling coal from the subjacent alarm structures.

The form of my invention shown in Figs. VI and VII differs from that above described only in the substitution of the alarm bell 41 for the alarm horn 38 shown in Fig. I, as above noted, and the provision of the exterior switch handle 76 at the top of the casing, with corresponding changes in the electrical connections.

Both forms of my invention above described have hooks 80 extending rigidly from the casing bodies 2 with their free ends 81 in pendent spaced relation with the back of the casing, and a handle 82 connecting said hooks at the top of said casing, whereby said casing may be attached and removed with respect to a support, for instance, as shown in Fig. I, wherein said attaching means overhangs the top of the front wall 85 of the mine car 86 in engagement with both the outside and inside thereof; the construction and arrangement being such that although the complete electric signaling system mounted in the casing 1 and portable therewith may be instantly manually attached or detached with respect to the vehicle, it may not be accidentally dislodged by any stress to which such a vehicle is normally subjected.

The capacity of the batteries above described is such as to simultaneously operate both alarm signals continuously for eight hours on a single charge, and each cell may be instantly removed by merely lifting it from its position in the casing, and be quickly and easily recharged and replaced. However, the switch mechanism described may be utilized to conserve the electric energy of the system by breaking the circuit except at such times as the apparatus is in actual service, so that service for much longer than eight hours may be obtained from a single charge. As above noted the apparatus is designed to seclude the electrical elements from tampering by unskilled laborers. However, the attaching means are so designed that each apparatus may be shifted from car to car by such laborers; so as to minimize the cost of an equipment adequate for any member of cars; each car being equipped with a signaling system only when it is necessary for a car to make a trip; so that in actual practice only a small number of portable signaling systems, constructed in accordance with my invention, are required for a large number of cars and locomotives in mine service.

I do not desire to limit myself to the precise details of construction and arrangement herein set forth, as it is obvious that various modifications may be made therein without departing from the essential features of my invention as defined in the appended claims.

I claim:—

1. The combination with a mine car having a front wall open at the top upon both sides thereof; of a casing having hooks detachably fitted to the top of said wall and engaging both the outside and inside thereof; a complete electric signaling system mounted in said casing and portable therewith, including a storage battery, an audible alarm, a red light lamp, and switching mechanism, whereby both said audible alarm and said lamp may be simultaneously included in or excluded from circuit with said battery.

2. The combination with a vehicle having a front wall open at the top upon both sides thereof; of a casing having means detachably fitted to the top of said wall and engaging both the outside and inside thereof; a complete electric signaling system mounted in said casing and portable therewith, including a storage battery, an audible alarm, a red light lamp, and switching mechanism, whereby both said audible alarm and said lamp may be simultaneously included in or excluded from circuit with said battery.

3. The combination with a vehicle having a front wall open at the top upon both sides thereof; of a casing having means detachably engaging both the outside and inside of said wall; a complete electric signaling system mounted in said casing and portable therewith, including a storage battery, an audible alarm, a red light lamp, and switching mechanism, whereby both said audible alarm and said lamp may be simultaneously included in or excluded from circuit with said battery.

4. The combination with a vehicle having a front wall open at the top upon both sides thereof; of a casing having means detachably engaging both the outside and inside of said wall; a complete electric signaling system mounted in said casing and portable therewith, including a source of electric current, an audible alarm, a visible alarm, and switching mechanism whereby said alarms may be included in or excluded from circuit with said source of current.

5. The combination with a casing, including a body and a lid; of complementary hinge members upon said body and lid; complementary clasp members upon said body and lid; a lock keeper lug on said lid adjacent said clasp members; a locking bar having its opposite ends extending in the same direction in axial alinement, adapted to connect said clasp members, and having an intermediate bight adapted to engage said keeper lug; and a padlock having a shackle fitted to said keeper lug; whereby said locking bar may be held in engagement with said clasp members to secure said casing in closed position; a lamp frame upon the front of said casing; an electric incandescent lamp in said frame; a red glass at the front of said frame; an audible alarm frame at the front of said casing; an electric vibrator in said alarm frame; spring terminals in said casing; two storage battery cells in said casing in electrical engagement with said terminals; switch mechanism including a spring contact lever in said casing, a shaft for said lever, and a handle on said shaft exterior to said casing; and electrical connections including said lamp and electric vibrator in circuit with said battery cells, under control of said switch mechanism; whereby both said lamp and said vibrator may be simultaneously included in or excluded from circuit with said cells.

6. The combination with a casing, including a body and a lid; of complementary hinge members upon said body and lid; complementary clasp members upon said body and lid; a lock keeper lug on said lid adjacent said clasp members; a locking bar having its opposite ends extending in the same direction in axial alinement, adapted to connect said clasp members, and having an intermediate bight adapted to engage said keeper lug; and a padlock having a shackle fitted to said keeper lug; whereby said locking bar may be held in engagement with said clasp members to secure said casing in closed position; a lamp frame upon the front of said casing; an electric incandescent lamp in said frame; a red glass at the front of said frame; an audible alarm frame at the front of said casing; an electric vibrator in said alarm frame; spring terminals in said casing; a storage battery in said casing in electrical engagement with said terminals; switch mechanism including a spring contact lever in said casing, a shaft for said lever, and a handle on said shaft exterior to said casing; and electrical connections including said lamp and electric vibrator in circuit with said battery, under control of said switch mechanism; whereby both said lamp and said vibrator may be simultaneously included in or excluded from circuit with said battery.

7. The combination with a casing, including a body and a lid; of locking means arranged to secure said casing in closed position; a lamp frame upon the front of said casing; an electric incandescent lamp in said frame; a red glass at the front of said frame; an audible alarm frame at the front of said casing; an electric vibrator in said alarm frame; spring terminals in said casing; two storage battery cells in said casing in electrical engagement with said terminals; switch mechanism including a spring contact lever in said casing, a shaft for said lever, and a handle on said shaft exterior to said casing; and electrical connections including said lamp and electric vibrator in circuit with said battery cells, under control of said switch mechanism; whereby both said lamp and said vibrator may be simultaneously included in or excluded from circuit with said cells.

8. The combination with a casing, including a body and a lid; of locking means arranged to secure said casing in closed position; a lamp frame upon the front of said casing; an electric incandescent lamp in said frame; a red glass at the front of said frame; an audible alarm frame at the front of said casing; an electric vibrator in said alarm frame; spring terminals in said casing; a storage battery in said casing in electrical engagement with said terminals; switch mechanism including a contact member in said casing and a handle for said member exterior to said casing; and electrical connections including said lamp and electric vibrator in circuit with said battery, under control of said switch mechanism; whereby both said lamp and said vibrator may be simultaneously included in or excluded from circuit with said battery.

9. The combination with a casing, including a body and lid; of complementary hinge members upon said body and lid; complementary clasp members upon said body and lid; a lock keeper lug on said lid adjacent said clasp members; a locking bar having its opposite ends extending in the same direction in axial alinement, adapted to connect said clasp members, and having an intermediate bight adapted to engage said keeper lug; and a padlock having a shackle fitted to said keeper lug; whereby said locking bar may be held in engagement with said clasp members to secure said casing in closed position; hooks extending rigidly from said casing body with their free ends in pendent spaced relation with the back of the casing, and a handle connecting said hooks at the top of said casing; whereby said casing may be attached and removed with respect to a support; a lamp frame upon the front of said casing; an electric incandescent lamp in said frame; an audible alarm frame at the front of said casing; an electric vibrator in said alarm frame; a battery in said casing; switch mechanism, carried by said casing, including a handle exterior to said casing; and electrical connections including said lamp and electric vibrator in circuit with said battery, under control of said switch mechanism; whereby said lamp and said vibrator may be included in or excluded from circuit with said battery.

10. The combination with a casing, including a body and lid; of complementary hinge members upon said body and lid; complementary clasp members upon said body and lid; a lock keeper lug on said lid adjacent said clasp members; a locking bar having its opposite ends extending in the same direction in axial alinement, adapted to connect said clasp members, and having an intermediate bight adapted to engage said keeper lug; and a padlock having a shackle fitted to said keeper lug; whereby said locking bar may be held in engagement with said clasp members to secure said casing in closed position; hooks extending rigidly from said casing body with their free ends in pendent spaced relation with the back of the casing at the top of said casing; whereby said casing may be attached and removed with respect to a support; a visible alarm including a lamp in said casing; an audible alarm including an electric vibrator in said casing; a battery in said casing; switch mechanism, carried by said casing, including a handle exterior to said casing; and electrical connections including said lamp and electric vibrator in circuit with said battery, under control of said switch mechanism; whereby said lamp and said vibrator may be included in or excluded from circuit with said battery.

11. The combination with a casing, including a body and lid; of complementary hinge members upon said body and lid; complementary clasp members upon said body and lid; a lock keeper lug on said lid adjacent said clasp members; a locking bar having its opposite ends extending in the same direction in axial alinement, adapted to connect said clasp members, and having an intermediate bight adapted to engage said keeper lug; and a padlock having a shackle fitted to said keeper lug; whereby said locking bar may be held in engagement with said clasp members to secure said casing in closed position; and means on said casing, whereby said casing may be attached and removed with respect to a support; a visible alarm including a lamp carried by said casing; an audible alarm including an electric vibrator in said casing; a battery in said casing; switch mechanism, carried by said casing, including a handle exterior to said casing; and electrical connections including said lamp and electric vibrator in circuit with said battery, under control of said switch mechanism; whereby said lamp and said vibrator may be included in or excluded from circuit with said battery.

12. The combination with a casing, including a body and lid; of locking means arranged to secure said casing in closed position; hooks extending rigidly from said casing body with their free ends in pendent spaced relation with the back of the casing, and a handle connecting said hooks at the top of said casing; whereby said casing may be attached and removed with respect to a support; a lamp frame upon the front of said casing; an electric incandescent lamp in said frame; an audible alarm frame at the front of said casing; an electric vibrator in said alarm frame; a battery in said casing; switch mechanism, carried by said casing, including a handle exterior to said casing; and electrical connections including said lamp and electric vibrator in circuit with said battery, under control of said switch mechanism; whereby said lamp and said vibrator may be included in or excluded from circuit with said battery.

13. The combination with a casing, including a body and lid; of locking means arranged to secure said casing in closed position; and hooks extending rigidly from said casing body with their free ends in pendent spaced relation with the back of the casing; whereby said casing may be attached and removed with respect to a support; a lamp frame upon the front of said casing; an electric incandescent lamp in said frame; an audible alarm frame at the front of said casing; an electric vibrator in said alarm frame; a battery in said casing; switch mechanism, carried by said casing, including a handle exterior to said casing; and electrical connections including said lamp and electric vibrator in circuit with said battery, under control of said switch mechanism; whereby said lamp and said vibrator may be included in or excluded from circuit with said battery.

14. The combination with a casing, including a body and lid; of locking means arranged to secure said casing in closed position; and means on said casing, whereby said casing may be attached and removed with respect to a support; a visible alarm including a lamp carried by said casing; an audible alarm including an electric vibrator in said casing; a battery in said casing; switch mechanism, carried by said casing, including a handle exterior to said casing; and electrical connections including said lamp and electric vibrator in circuit with said battery, under control of said switch mechanism; whereby said lamp and said vibrator may be included in or excluded from circuit with said battery.

15. In an electric alarm system, the combination with a casing: of a battery carried by said casing; a signaling device carried by said casing and manifest exterior thereto; switch mechanism, carried by said casing, including a member exterior to said casing; and a ledge on said casing overhanging said switch member and shielding the same from falling objects.

In testimony whereof, I have hereunto signed my name at Philadelphia, Pennsylvania, this twenty-fifth day of May, 1915.

HIRAM HARRY HIRSCH.

Witnesses:
FANNIE LILLIAN SACK,
C. W. HARTER.

It is hereby certified that in Letters Patent No. 1,181,665, granted May 2, 1916, upon the application of Hiram Harry Hirsch, of Philadelphia, Pennsylvania, for an improvement in "Vehicle Electric Signaling Devices," errors appear in the printed specification requiring correction as follows: Page 2, line 86, for the reference-numeral "48" read *43;* same page, lines 87–88, for the words and numeral "Terminal signaling devices 43 are" read *Said terminal 43 is;* and that the said Letters Patent should be read with these corrections therein that the same may conform to the record of the case in the Patent Office.

Signed and sealed this 23d day of May, A. D., 1916.

[SEAL.]

J. T. NEWTON,

*Acting Commissioner of Patents.*

Cl. 177—339.